R. W. PECK.
Piston-Packing.
No. 222,728.   Patented Dec. 16, 1879.
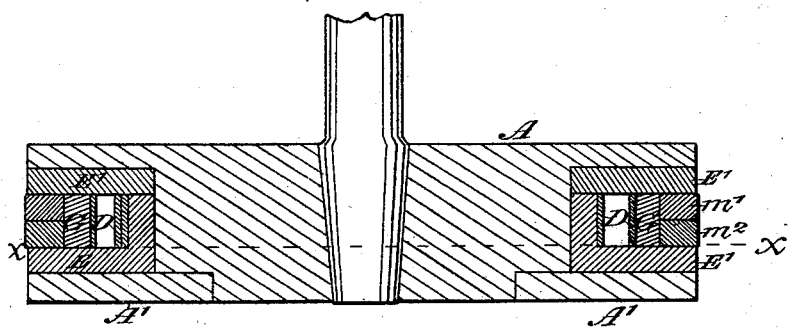
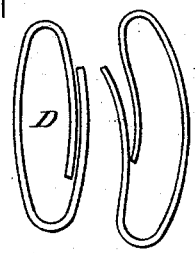
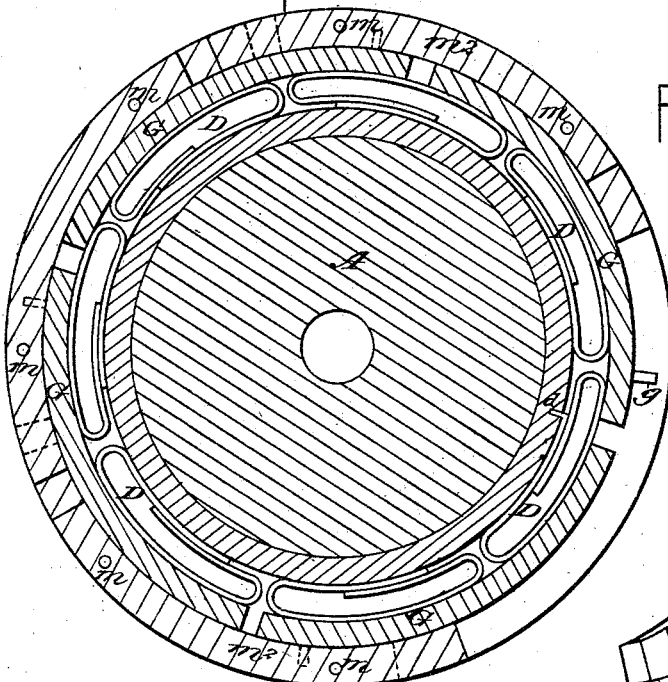
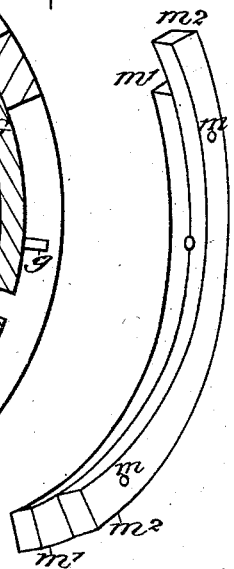
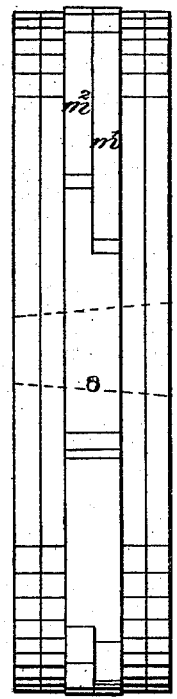
WITNESSES:
Charles C. Stetson
E. B. Bolton
INVENTOR:
Richard W. Peck,
by his attorney J. D. Stetson

UNITED STATES PATENT OFFICE.

RICHARD W. PECK, OF BROOKLYN, N. Y., ASSIGNOR TO HIMSELF, JOHN LYNCH, OF SAME PLACE, AND LYMAN HOWARD, OF ESSEX, CONN.

IMPROVEMENT IN PISTON-PACKINGS.

Specification forming part of Letters Patent No. 222,728, dated December 16, 1879; application filed July 25, 1879.

*To all whom it may concern:*

Be it known that I, RICHARD W. PECK, of Brooklyn, Kings county, and State of New York, have invented certain new and useful Improvements Relating to Piston-Packings, of which the following is a specification.

I have devised a new form of spring which possesses marked advantages. I have also devised a construction of packing in sections adapted to be made in cast-iron or hard brass, plain or babbitted. The packing is more than ordinarily convenient of application and repair, and is especially adapted for use in cylinders which have worn oval or otherwise become imperfect in shape.

The recess for the packing may be of the ordinary form, and the packing may be inclosed and retained by the aid of an ordinary follower.

I make the exterior packing in the form of two sets of sections side by side, each pair of sections being riveted together a little joggled. When the sections are applied together the offsets at the ends make tight joints with liberal room for expansion and contraction. Another layer composed of full-width sections underlies the first, and is engaged therewith by the aid of projections or dowels, which insure the correct positions of the parts with great mobility in the radial direction. Under the whole line are placed my springs urging all the sections outward. A moderate force in the springs maintains a tight piston. If the cylinder is tapering or any way out of truth, the packing yields by virtue of its multiplicity of freely-jointed sections.

The accompanying drawings form a part of this specification, and represent what I consider the best means of carrying out the invention.

Figure 1 is a central section through the piston complete. Fig. 2 is a plan or end view, on the line $x\ x$ in Fig. 1, with the follower and with one of the double sections on the outside ring removed. Fig. 3 is an edge view of the same. Fig. 4 is a perspective view of the detached section. Fig. 5 represents one of the springs detached.

It is shown in two of the many forms which it may be manufactured in, so as to apply in the cavity in the piston, and bear equally against the inner face of the inner ring of packing.

Similar letters of reference indicate corresponding parts in all the figures.

A is the body of the piston, and A' the follower. These parts may be applied together in any ordinary or suitable manner.

The exterior or wearing sections of the packing are marked $m'\ m^2$. The length of each is a little less than a quarter of the circumference of the piston. Each pair, $m'\ m^2$, is rigidly secured together by two or more rivets, $m$, in such positions that the part $m'$ projects at one end, and the part $m^2$ projects at the other. A hole is formed on the inner face extending about half-way through to the outer face. The whole series of riveted sections $m'\ m^2$ are alike. Within these lies another set of sections having a width equal to both the sections $m'\ m^2$. The ends of these may be plain. Near one end of each is a projection, $g$.

Within the sections G, between them and the main body, are a set of springs, D, which are peculiarly formed. Each is composed of a strip of steel of proper thickness, and of a little less width than the inner series of sections G. Each is bent in the form of an elongated loop, with the ends overlapping each other near the mid-length of the loop. For pistons of large size both faces of the spring should belly or round out a little when freed. Thus formed, the ends will possess a uniform degree of elasticity, and on being compressed and forced into the piston, with the lap-joint inward toward the axis of the piston, the entire outer face is urged outward with nearly uniform force at every point, and with a nearly uniform freedom to yield inward, to a considerable extent, at any and all points. The lengths of these springs should be carefully proportioned to the piston they are to work in, so that when in place they shall constitute a series extending around and nearly or quite touching each other at the several ends. This insures that they shall be uniformly distributed. An end of each may be formed in a projection or dowel, and engaged in a recess of the main body, A, of the piston; but my experiments do not indicate that such will be generally necessary. Such is shown at $d$ at the right hand of the Fig. 2.

In applying my packing to new pistons, the recess for the packing may be made considerably narrower than is allowed for ordinary packing. In applying it to old pistons, the excess of space allowed in the old piston is filled by cheek-pieces E', which may be continuous rings, bearing solidly on the bottom of the packing-recess.

Modifications may be made. The number of compound sections $m'$ $m^2$ of the exterior packing, and of the simple sections G of the interior packing, may be greatly increased; or it may be reduced to three, without sacrificing the advantages of the invention. The pair of sections $m'$ $m^2$ may be tinned and joined by soft metal in the manner of sweating or soldering; or they may be connected quite loosely by a single pin, $m$, near the center of the length, allowing them to swivel.

I claim as my invention—

1. A packing-spring, D, consisting of an elongated metal loop, with the ends overlapping, as shown, adapted to serve in a piston, as herein specified.

2. The piston-packing described, composed of the compound short sections $m'$ $m^2$, secured together in joggled positions and arranged to break joints, as shown, in combination with the underlying sections G, connected by dowels $g$, and with suitable springs D within the latter, arranged to constitute a highly-yielding packing, as herein specified.

In testimony whereof I have hereunto set my hand this 14th day of July, 1879, in the presence of two subscribing witnesses.

RICHARD W. PECK.

Witnesses:
 WM. C. DEY,
 CHARLES C. STETSON.